Nov. 4, 1924.  1,514,327
W. KRAUSE
PIPE JOINT FOR IRRIGATION SYSTEMS
Filed May 21, 1920

Witnesses:

Inventor:
Walter Krause
by John Lotka
Attorney:

Patented Nov. 4, 1924.

1,514,327

UNITED STATES PATENT OFFICE.

WALTER KRAUSE, OF FRIESACK, GERMANY.

PIPE JOINT FOR IRRIGATION SYSTEMS.

Application filed May 21, 1920. Serial No. 383,321.

(GRANTED UNDER THE PROVISIONS OF THE ACT OF MARCH 3, 1921, 41 STAT. L., 1313.)

*To all whom it may concern:*

Be it known that I, WALTER KRAUSE, a citizen of Germany, and resident of Friesack, Mark, Germany, have invented certain new and useful Improvements in Pipe Joints for Irrigation Systems (for which I have filed applications in Germany, filed August 23, 1918, no patent issued as yet; Austria, filed January 29, 1919, Patent No. 85,055; Hungary, filed February 1, 1919, no patent issued as yet; France, filed February 11, 1919, Patent No. 517,859; Spain, filed February 27, 1919, Patent No. 69,176; Denmark, filed February 5, 1919, Patent No. 26,759; Belgium, filed February 24, 1919, Patent No. 279,058; Netherlands, filed March 10, 1919, no patent issued as yet; Italy, filed February 25, 1919, Patent No. 97/542; Luxemburg, filed October 4, 1919, Patent No. 11,525; Rumania, filed October 7, 1919, Patent No. 5,058; Sweden, filed January 31, 1919, no patent issued as yet; Canada, filed May 26, 1920, Patent No. 220,940; Great Britain, filed January 27, 1920, Patent No. 138,346; Poland, filed July 5, 1920, no patent issued as yet; Czechoslovakia Republic, filed June 18, 1920, no patent issued as yet; Argentine Republic, filed August 3, 1920, no patent issued as yet), of which the following is a specification.

My invention relates to improvements in pipe joints for irrigation systems, and more particularly for irrigation systems of that class in which the water is supplied to sprinkling devices through conduits which consist of a plurality of sectional pipes carrying the sprinkling devices and adapted to be connected by joints permitting of a ready assembling and disconnecting of the pipes for carrying the same from one point of use to another one. Such pipe sections are ordinarily made as long as possible in order to reduce the work connected with assembling the conduits, and for convenience in assembling the pipes I have provided the same with joints and spacing members by means of which they can be set by the attendant carrying the same in the proper relative positions when depositing the same on the ground, as I have described in a copending application for patent, Serial No. 383,020, filed May 20, 1920. The object of the present improvements is to provide a joint for pipes of the class referred to, by means of which the pipes are set in the proper relative positions, and the joint is made in a reliable way, the means provided for these purposes being particularly simple in construction. With this object in view my invention consists in constructing the flanges of the pipes to be jointed in the form of claws which engage each other and thereby provide the spacing means, the engaging parts of the flanges being preferably in the form of wedges. For the purpose of explaining the invention several examples embodying the same have been shown in the accompanying drawing, in which,—

Figure 1:
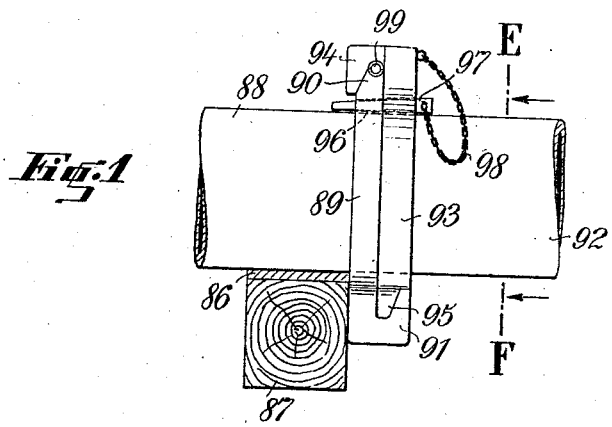
Fig. 1, is a side view of the joint.
Figure 2:
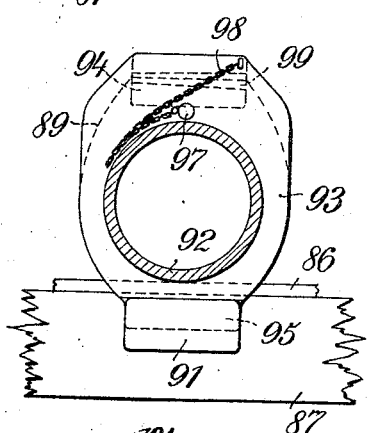
Fig. 2, is a vertical section taken on the line E—F of Fig. 1.

In the pipe joint shown by way of example in Figs. 1 and 2 the pipe 88 supported by a plate 86 on a block 87 is formed at its end with a flange 89 which at its top part is formed as a simple wedge 90 and at its bottom part with a claw 91 the flange of which is likewise wedge-shaped. The end of the adjacent pipe 92 is provided with a flange 93 the top part of which is in the form of a wedge-shaped claw 94, while the bottom part is in the form of a simple wedge 95.

As the claws 91, 94 and wedges 90, 95 engage each other the flanges 89, 93 provide the spacing members for the pipes 88, 92 to be connected with each other. By the wedge-shaped parts 90, 91, 94, 95 a tight joint is made between the contacting faces of the pipe flanges 89, 93 when coupling the same, and the joint is preferably further improved by providing an elastic packing between the flanges.

Preferably the pipe joint so far described is locked by a wedge 97 inserted in holes 96 made in the flanges 89, 93, which wedge is preferably attached to a chain 98. The said wedge may also be used for lifting the flange 93 from the flange 89, by inserting the wedge in a passage or clearance 99 provided between the wedge-shaped part 90 and the claw 94.

Figure 3:
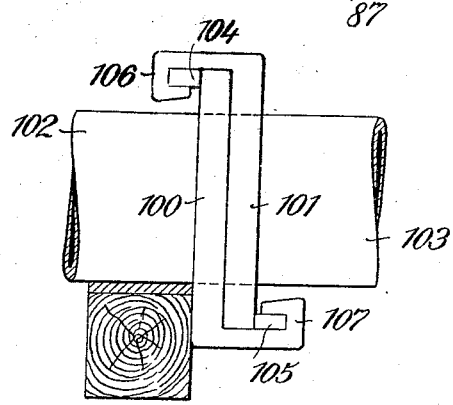
Fig. 3, is a side view showing a modification.

In the modification shown in Fig. 3 the construction of the pipe joint is such that the interengaging flanges 100, 101 of the pipes 102 and 103 to be jointed are adapted to be forced in axial direction and into engagement with each other by transverse wedges 104 and 105 forced between one flange and a claw formed on the other flange. As shown the wedges 104 and 105 bear with one side on the rear faces of the flanges 100 and 101 respectively and with the other sides on the inner faces of the claws 106 and 107 respectively. Preferably the said inner faces of the claws are wedge-shaped accordingly in order to secure a complete contact with the wedges 104 and 105.

The modification shown in Fig. 3 is preferable in this respect that a packing of leather or the like provided between the flanges 100 and 101 is acted upon in axial direction and exclusively by pressure when forcing the wedges in position. It will be noted, particularly from Fig. 2, that the claws 91, 94 in Figs. 1 and 2, as well as the claws 106, 107 in Fig. 3, are straight and parallel to each other, at least as regards those claw faces which are adapted for sliding engagement with the wedges 90, 95 in Figs. 1 and 2, or with the wedges 104, 105 in Fig. 3. As will appear from Fig. 2, a considerable space is left between the parallel transverse slideways or guiding surfaces which are located on opposite sides of the pipe axis, and by virtue of this special arrangement the pipes may be brought together either by a vertical movement of one pipe relatively to the other, or by introducing one pipe laterally or horizontally, from one side or the other. Owing to this possibility of bringing the pipes into aligning position not only by a relative vertical movement, but by a relative lateral horizontal movement as well, I am enabled to employ my improved pipe-joint in situations where a joint providing only for vertical mobility would not be applicable.

I claim:

1. A pipe joint comprising pipe sections one of which has upwardly-open parallel transverse surfaces on opposite sides of the pipe axis, while the other section has engaging portions adapted to be brought into engagement therewith either by a relative vertical movement of the sections, transversely to said surfaces or by a relative lateral movement of said sections, in a direction lengthwise of said surfaces.

2. A pipe joint comprising flanges formed on the pipes to be coupled, at least one of said flanges being formed with a claw embracing the other one for spacing the pipes and forcing the flanges together, and a wedge forced between the claw and the rear face of the flange.

3. A pipe joint comprising flanges formed on the pipes to be coupled, at least one of said flanges being formed with a claw embracing the other one for spacing the pipes and forcing the flanges together, and a clearance provided between the claw and flange in position for disconnecting the flanges by means of a wedge inserted therein.

In testimony whereof I hereunto affix my signature in the presence of two witnesses.

WALTER KRAUSE.

Witnesses:
GRETE GUTZEIT,
GERTRUD FÄHNRICH.